(12) United States Patent
Wang

(10) Patent No.: US 11,775,118 B2
(45) Date of Patent: Oct. 3, 2023

(54) TOUCH DISPLAY PANEL AND MANUFACTURING METHOD OF TOUCH DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventor: Xing Wang, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 258 days.

(21) Appl. No.: 17/264,810

(22) PCT Filed: Oct. 15, 2020

(86) PCT No.: PCT/CN2020/121084
§ 371 (c)(1),
(2) Date: Jan. 30, 2021

(87) PCT Pub. No.: WO2022/041410
PCT Pub. Date: Mar. 3, 2022

(65) Prior Publication Data
US 2022/0398000 A1 Dec. 15, 2022

(30) Foreign Application Priority Data
Aug. 27, 2020 (CN) .......................... 202010880061.7

(51) Int. Cl.
*G06F 3/041* (2006.01)
*G06F 3/01* (2006.01)

(52) U.S. Cl.
CPC .......... *G06F 3/04186* (2019.05); *G06F 3/016* (2013.01)

(58) Field of Classification Search
None
See application file for complete search history.

(56) References Cited

U.S. PATENT DOCUMENTS

2015/0029116 A1\* 1/2015 Kim ...................... G06F 3/0443
345/173
2016/0224170 A1 8/2016 Kim
(Continued)

FOREIGN PATENT DOCUMENTS

CN 103389819 A 11/2013
CN 104020906 A 9/2014
(Continued)

OTHER PUBLICATIONS

International Search Report in International application No. PCT/CN2020/121084, dated Apr. 27, 2021.
(Continued)

*Primary Examiner* — Carl Adams
(74) *Attorney, Agent, or Firm* — PV IP PC; Wei Chung; Zhigang Ma

(57) ABSTRACT

The present application provides a touch display panel and a manufacturing method of a touch display panel. A first touch unit and a second touch unit of different sizes are arranged on the touch layer, and the size of the first touch unit is smaller than the size of the second touch unit, so that one end of the first touch region provided with the first touch unit forms a wiring region on one end close to the connecting portion to accommodate touch lines of the first touch unit and the second touch unit, and therefore a bezel width of the touch display panel can be reduced.

12 Claims, 5 Drawing Sheets

(56) References Cited

U.S. PATENT DOCUMENTS

2016/0291781 A1* 10/2016 He .................. G06F 3/0443
2019/0121484 A1* 4/2019 Zhang ................ G06F 3/044

FOREIGN PATENT DOCUMENTS

| CN | 104298411 A | 1/2015 |
|---|---|---|
| CN | 105677125 A | 6/2016 |
| CN | 105808027 A | 7/2016 |
| CN | 106373981 A | 2/2017 |
| CN | 107506080 A | 12/2017 |
| CN | 107678197 A | 2/2018 |
| CN | 107831937 A | 3/2018 |
| CN | 108598142 A | 9/2018 |

OTHER PUBLICATIONS

Written Opinion of the International Search Authority in International application No. PCT/CN2020/121084, dated Apr. 27, 2021.
Chinese Office Action issued in corresponding Chinese Patent Application No. 202010880061.7 dated Jul. 2, 2021, pp. 1-8.

* cited by examiner

TOUCH DISPLAY PANEL AND MANUFACTURING METHOD OF TOUCH DISPLAY PANEL

RELATED APPLICATIONS

This application is a National Phase of PCT Patent Application No. PCT/CN2020/121084 having international filing date of Oct. 15, 2020, which claims the benefit of priority of Chinese Patent Application No. 202010880061.7 filed on Aug. 27, 2020. The contents of the above applications are all incorporated by reference as if fully set forth herein in their entirety.

FIELD OF DISCLOSURE

The present application relates to a display technology and in particular, to a touch display panel and a manufacturing method of a touch display panel.

DESCRIPTION OF RELATED ART

Due to technological development on mobile terminals such as mobile phones, the size of a mobile phone screen and touch performance greatly impact user experience. Large screens and foldable screens allow people to have excellent user experience. In order to meet the needs of large-size screens in the future, research on touch display panels is becoming increasingly important.

In touch display panels of the related art, each touch unit needs to be connected to a circuit board in a non-display region through a touch line. Since a large-size touch display panel has many touch lines, the touch lines need to occupy a space in the touch display panel, which is not conducive to a narrow bezel design of the touch display panel.

SUMMARY

The present application provides a touch display panel and a manufacturing method of the touch display panel. By reducing sizes of some touch units, a wiring region is formed on the touch layer, the touch lines are collected in the wiring region, and thereby a bezel width of the touch display panel is reduced.

The present application provides a touch display panel, comprising:

a touch layer comprising at least one first touch region and at least one second touch region, wherein the first touch region and the second touch region have a same area, at least one first touch unit is arranged in the first touch region, and a plurality of second touch units are arranged in the second touch region; and a connecting portion connected to the first touch unit and the second touch unit through a plurality of touch lines;

wherein a size of the first touch unit is smaller than a size of the second touch unit, a wiring region is formed on one end of the first touch region close to the connecting portion, and the wiring region is configured to accommodate the touch lines.

In the touch display panel according to one embodiment of the present application, a first distance is defined between the connecting portion and a touch unit closest to the connecting portion in the first touch region, a second distance is defined between the connecting portion and a touch unit closest to the connecting portion in the second touch region, and the first distance is greater than the second distance.

In the touch display panel according to one embodiment of the present application, a plurality of touch units in the first touch region are arranged along a first direction, and the plurality of touch units in the first touch region comprise at least one first touch unit; and a plurality of touch units in the second touch region are arranged along the first direction, and all of the plurality of touch units in the second touch region are the second touch units.

In the touch display panel according to one embodiment of the present application, the plurality of touch units in the first touch region comprise one first touch unit and the plurality of second touch units, and the plurality of second touch units in the first touch region are all located at one side of the first touch unit away from the connecting portion.

In the touch display panel according to one embodiment of the present application, a first interval is defined between the adjacent touch units in the first touch region, and a second interval is defined between the adjacent touch units in the second touch region, and the first interval is equal to the second interval.

In the touch display panel according to one embodiment of the present application, a first interval is defined between the adjacent touch units in the first touch region, a second interval is defined between the adjacent touch units in the second touch region, and the first interval is less than the second interval.

In the touch display panel according to one embodiment of the present application, the touch layer comprises multiple first touch regions and multiple second touch regions, and the first touch regions and the second touch regions are alternately arranged.

In the touch display panel according to one embodiment of the present application, each touch unit in the first touch region is connected to one end of a first touch line, and another end of the first touch line is connected to the connecting portion; and each touch unit in the second touch region adjacent to a column of the first touch units is connected to one end of a second touch line, and another end of the second touch line is connected to the connecting portion;

wherein the first touch line comprises a first line segment connected to the connecting portion, the second touch line comprises a second line segment connected to the connecting portion, and at least a portion of the first line segment and at least a portion of the second line segment are located in the wiring region of the first touch region.

In the touch display panel according to one embodiment of the present application, the first line segment comprises a first sub-segment in a second direction and a second sub-segment in a third direction, and the second line segment comprises a third sub-segment in the third direction and a fourth sub-segment in the third direction, and the second direction is perpendicular to the third direction.

In the touch display panel according to one embodiment of the present application, the first sub-segments are arranged at equal intervals in the wiring region, and the third sub-segments are arranged at equal intervals in the wiring region.

The present application provides a manufacturing method of a touch display panel, comprising:

depositing a touch metal layer on an encapsulation layer; and patterning the touch metal layer to form a touch layer;

wherein the touch layer comprises at least one first touch region and at least one second touch region, the first touch region and the second touch region have a same area, and at least one first touch unit is arranged in the first touch region, and a plurality of second touch units are arranged in the second touch region, a size of the first touch unit is smaller than a size of the second touch unit, a wiring region is formed on one end of the first touch region close to the connecting portion, and the wiring region is configured to accommodate touch lines of the first touch unit and the second touch unit.

In the manufacturing method of the touch display panel according to one embodiment of the present application, a first distance is defined between the connecting portion and a touch unit closest to the connecting portion in the first touch region, a second distance is defined between the connecting portion and a touch unit closest to the connecting portion in the second touch region, and the first distance is greater than the second distance.

In the manufacturing method of the touch display panel according to one embodiment of the present application, a plurality of touch units in the first touch region are arranged along a first direction, and the plurality of touch units in the first touch region comprise at least one first touch unit; and a plurality of touch units in the second touch region are arranged along the first direction, and all of the plurality of touch units in the second touch region are the second touch units.

In the manufacturing method of the touch display panel according to one embodiment of the present application, the plurality of touch units in the first touch region comprise one first touch unit and the plurality of second touch units, and the plurality of second touch units in the first touch region are all located at one side of the first touch unit away from the connecting portion.

In the manufacturing method of the touch display panel according to one embodiment of the present application, a first interval is defined between the adjacent touch units in the first touch region, and a second interval is defined between the adjacent touch units in the second touch region, and the first interval is equal to the second interval.

In the manufacturing method of the touch display panel according to one embodiment of the present application, a first interval is defined between the adjacent touch units in the first touch region, a second interval is defined between the adjacent touch units in the second touch region, and the first interval is less than the second interval.

In the manufacturing method of the touch display panel according to one embodiment of the present application, the touch layer comprises multiple first touch regions and multiple second touch regions, and the first touch regions and the second touch regions are alternately arranged.

In the manufacturing method of the touch display panel according to one embodiment of the present application, each touch unit in the first touch region is connected to one end of a first touch line, and another end of the first touch line is connected to the connecting portion; and each touch unit in the second touch region adjacent to a column of the first touch units is connected to one end of a second touch line, and another end of the second touch line is connected to the connecting portion;

wherein the first touch line comprises a first line segment connected to the connecting portion, the second touch line comprises a second line segment connected to the connecting portion, and at least a portion of the first line segment and at least a portion of the second line segment are located in the wiring region of the first touch region.

In the manufacturing method of the touch display panel according to one embodiment of the present application, the first line segment comprises a first sub-segment in a second direction and a second sub-segment in a third direction, and the second line segment comprises a third sub-segment in the third direction and a fourth sub-segment in the third direction, and the second direction is perpendicular to the third direction.

In the manufacturing method of the touch display panel according to one embodiment of the present application, the first sub-segments are arranged at equal intervals in the wiring region, and the third sub-segments are arranged at equal intervals in the wiring region.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

Figure 1:
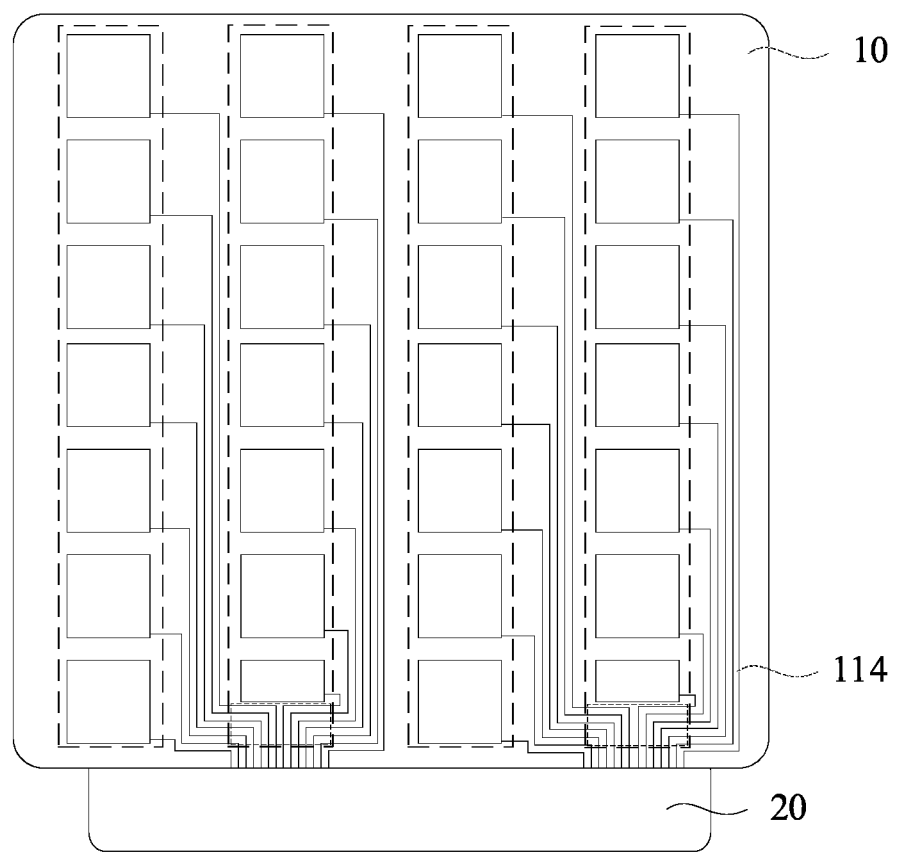
FIG. 1 is a first schematic structural view illustrating a touch display panel according to one embodiment of the present application.

The technical solutions of the present application will be clearly and completely described below in conjunction with the accompanying drawings with reference to the embodiments of the present application. Obviously, the described embodiments are only some of the embodiments of the present application, rather than all the embodiments. Based on the embodiments in the present application, all other embodiments obtained by those skilled in the art without creative work are within the protection scope of the present application.

A touch display panel is provided according to one embodiment of the present application, comprising:

a touch layer comprising at least one first touch region and at least one second touch region, wherein the first touch region and the second touch region have a same area, at least one first touch unit is arranged in the first touch region, and a plurality of second touch units are arranged in the second touch region; and a connecting portion connected to the first touch unit and the second touch unit through a plurality of touch lines;

wherein a size of the first touch unit is smaller than a size of the second touch unit, a wiring region is formed on one end of the first touch region close to the connecting portion, and the wiring region is configured to accommodate the touch lines.

In the touch display panel according to one embodiment of the present application, a first distance is defined between the connecting portion and a touch unit closest to the connecting portion in the first touch region, a second distance is defined between the connecting portion and a touch unit closest to the connecting portion in the second touch region, and the first distance is greater than the second distance.

In the touch display panel according to one embodiment of the present application, a plurality of touch units in the first touch region are arranged along a first direction, and the plurality of touch units in the first touch region comprise at least one first touch unit; and a plurality of touch units in the second touch region are arranged along the first direction, and all of the plurality of touch units in the second touch region are the second touch units.

In the touch display panel according to one embodiment of the present application, the plurality of touch units in the first touch region comprise one first touch unit and the plurality of second touch units, and the plurality of second touch units are all located at one side of the first touch unit away from the connecting portion.

In the touch display panel according to one embodiment of the present application, a first interval is defined between the adjacent touch units in the first touch region, and a second interval is defined between the adjacent touch units in the second touch region, and the first interval is equal to the second interval.

In the touch display panel according to one embodiment of the present application, a first interval is defined between the adjacent touch units in the first touch region, a second interval is defined between the adjacent touch units in the second touch region, and the first interval is less than the second interval.

In the touch display panel according to one embodiment of the present application, the touch layer comprises multiple first touch regions and multiple second touch regions, and the first touch regions and the second touch regions are alternately arranged.

In the touch display panel according to one embodiment of the present application, each touch unit in the first touch region is connected to one end of a first touch line, and another end of the first touch line is connected to the connecting portion; and each touch unit in the second touch region adjacent to a column of the first touch units is connected to one end of a second touch line, and another end of the second touch line is connected to the connecting portion;

wherein the first touch line comprises a first line segment connected to the connecting portion, the second touch line comprises a second line segment connected to the connecting portion, and at least a portion of the first line segment and at least a portion of the second line segment are located in the wiring region of the first touch region.

In the touch display panel according to one embodiment of the present application, the first line segment comprises a first sub-segment in a second direction and a second sub-segment in a third direction, and the second line segment comprises a third sub-segment in the third direction and a fourth sub-segment in the third direction, and the second direction is perpendicular to the third direction.

In the touch display panel according to one embodiment of the present application, the first sub-segments are arranged at equal intervals in the wiring region, and the third sub-segments are arranged at equal intervals in the wiring region.

The present application provides a manufacturing method of a touch display panel, comprising:

depositing a touch metal layer on an encapsulation layer; and patterning the touch metal layer to form a touch layer;

wherein the touch layer comprises at least one first touch region and at least one second touch region, the first touch region and the second touch region have a same area, and at least one first touch unit is arranged in the first touch region, and a plurality of second touch units are arranged in the second touch region, a size of the first touch unit is smaller than a size of the second touch unit, a wiring region is formed on one end of the first touch region close to the connecting portion, and the wiring region is used to accommodate touch lines of the first touch unit and the second touch unit.

In the manufacturing method of the touch display panel according to one embodiment of the present application, wherein a first distance is defined between the connecting portion and a touch unit closest to the connecting portion in the first touch region, a second distance is defined between the connecting portion and a touch unit closest to the connecting portion in the second touch region, and the first distance is greater than the second distance.

In the manufacturing method of the touch display panel according to one embodiment of the present application, a plurality of touch units in the first touch region are arranged along a first direction, and the plurality of touch units in the first touch region comprise at least one first touch unit; and a plurality of touch units in the second touch region are arranged along the first direction, and all of the plurality of touch units in the second touch region are the second touch units.

In the manufacturing method of the touch display panel according to one embodiment of the present application, the plurality of touch units in the first touch region comprise one first touch unit and the plurality of second touch units, and the plurality of second touch units in the first touch region are all located at one side of the first touch unit away from the connecting portion.

In the manufacturing method of the touch display panel according to one embodiment of the present application, a first interval is defined between the adjacent touch units in the first touch region, and a second interval is defined between the adjacent touch units in the second touch region, and the first interval is equal to the second interval.

In the manufacturing method of the touch display panel according to one embodiment of the present application, a first interval is defined between the adjacent touch units in the first touch region, a second interval is defined between the adjacent touch units in the second touch region, and the first interval is less than the second interval.

In the manufacturing method of the touch display panel according to one embodiment of the present application, the touch layer comprises multiple first touch regions and multiple second touch regions, and the first touch regions and the second touch regions are alternately arranged.

In the manufacturing method of the touch display panel according to one embodiment of the present application, each touch unit in the first touch region is connected to one end of a first touch line, and another end of the first touch line is connected to the connecting portion; and each touch unit in the second touch region adjacent to a column of the first touch units is connected to one end of a second touch line, and another end of the second touch line is connected to the connecting portion;

wherein the first touch line comprises a first line segment connected to the connecting portion, the second touch line comprises a second line segment connected to the connecting portion, and at least a portion of the first line segment and at least a portion of the second line segment are located in the wiring region of the first touch region.

In the manufacturing method of the touch display panel according to one embodiment of the present application, the first line segment comprises a first sub-segment in a second direction and a second sub-segment in a third direction, and the second line segment comprises a third sub-segment in the third direction and a fourth sub-segment in the third direction, and the second direction is perpendicular to the third direction.

In the manufacturing method of the touch display panel, the first sub-segments are arranged at equal intervals in the wiring region, and the third sub-segments are arranged at equal intervals in the wiring region.

Figure 2:
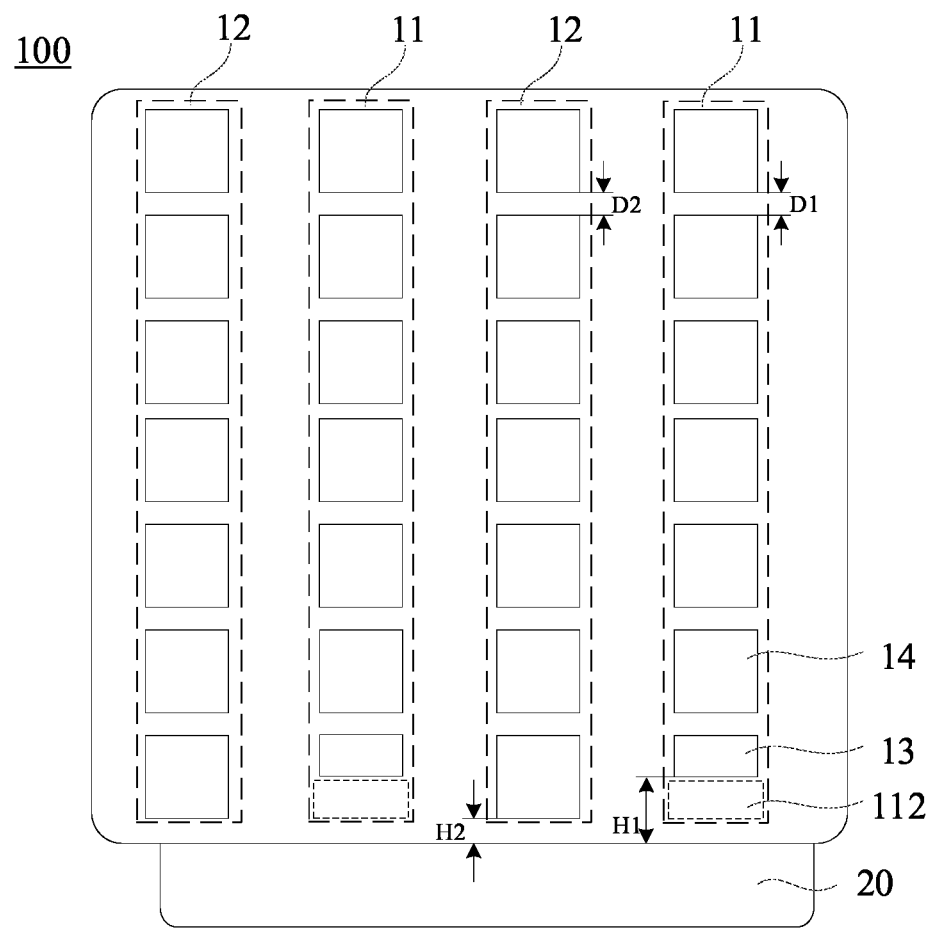
FIG. 2 is a second schematic structural view illustrating the touch display panel according to one embodiment of the present application.

Please refer to FIGS. 1 and 2. FIG. 1 is a first schematic structural view illustrating a touch display panel according to one embodiment of the present application. FIG. 2 is a second schematic structural view illustrating the touch display panel according to one embodiment of the present application.

A touch display panel 100 comprises a touch layer 10 and a connecting portion 20. The touch layer 10 comprises at least one first touch region 11 and at least one second touch region 12, wherein the first touch region 11 and the second touch region 12 have a same area, at least one first touch unit 13 is arranged in the first touch region 11, and a plurality of second touch units 14 are arranged in the second touch region 12; and wherein the first touch region 11 and the second touch region 12 are each provided with a plurality of touch units, the touch units in the first touch region 11 comprises at least one first touch unit 13, and the touch units in the second touch region 12 comprises the second touch units 14.

Furthermore, the touch layer 10 further comprises a plurality of touch lines 114, and the first touch unit 13 and the second touch unit 14 are connected to the connecting portion 20 through the plurality of touch lines 114. The connecting portion 20 is connected to a display driver part of the display panel.

A size of the first touch unit 13 is smaller than a size of the second touch unit 14, a wiring region 112 is formed on one end of the first touch region 11 close to the connecting portion 20, and the wiring region 112 is configured to accommodate the touch lines.

In other words, the size of the first touch unit 13 in the first touch region 11 is smaller than the size of the second touch unit 14 in the second touch region 12. Due to the small size of the first touch unit 13 in the first touch region 11, the first touch region 11 has the extra wiring region 112 compared to the second touch region 12. The wiring region 112 is formed one one end of the first touch region 11 close to the connecting portion 20, and the touch lines of the first touch unit 13 and the second touch unit 14 are at least partially located in the wiring region 112.

In the touch display panel 100 of the present application, the first touch unit 13 and the second touch unit 14 of different sizes are arranged on the touch layer 10, wherein the size of the first touch unit 13 is smaller than the size of the second touch unit 14, so that the first touch region 11 provided with the first touch unit 13 forms a wiring region 112 on one end close to the connecting portion 20. The wiring region 112 is used to accommodate the touch lines 114 of the first touch unit 13 and the second touch unit 14. When the first touch unit 13 and the second touch unit 14 are connected to the connecting portion 20 through the touch lines 114, the touch lines 114 can be at least partially bent and collected in the wiring region 112 of the first touch region 11, and thereby, a bezel width of the touch display panel 100 can be reduced.

Please refer to FIG. 2. A first distance H1 is defined between the connecting portion 20 and the touch unit closest to the connecting portion 20 in the first touch region 11, and a second distance H2 is defined between the connecting portion 20 and the touch unit closest to the connecting portion 20 in the second touch region 12. The first distance H1 is greater than the second distance H2.

It should be noted that, since the first distance H1 is greater than the second distance H2, an area at one side of the touch unit closest to the connecting portion 20 and facing the connecting portion 20 in the first touch region 11 is larger than an area at one side of the touch unit closest to the connecting portion 20 and facing the connecting portion 20 in the second touch region 12.

In other words, the first touch region 11 has the additional wiring region 112 at one side of the touch unit closest to the connecting portion 20 and facing the connecting portion 20, compared to an area of the second touch region 12 at one side of the touch unit closest to the connecting portion 20 and facing the connecting portion 20. In the present application, the wiring region 112 can be used to accommodate at least a portion of the touch lines 114 of the first touch unit 13 and the second touch unit 14, thereby reducing a bezel width of the touch display panel 100.

In the touch display panel 100 of the present application, the touch units in the first touch region 11 are arranged along a first direction, and the touch units in the first touch region 11 comprise at least one first touch unit 13; the touch units in the second touch region 12 are arranged along the first direction, and all the touch units in the second touch region 12 are the second touch units 14.

The first direction can be perpendicular to a length direction of the display panel, so that the touch units in the first touch area 11 and the second touch area 12 are all arranged in columns, that is, the first touch units 13 and the second touch units 14 can include at least one column of the touch units.

In the touch display panel 100 of the present application, a first interval D1 is defined between adjacent touch units in the first touch region 11, a second interval D2 is defined between adjacent touch units in the second touch region 12, and the first interval D1 is equal to the second interval D2.

The touch units in the first touch region 11 are arranged at equal intervals in the first touch region 11, that is, intervals between adjacent touch units in the first touch region 11 are equal to each other. Similarly, the touch units in the second touch region 12 are arranged at equal intervals in the second touch region 12, that is, intervals between adjacent touch units in the second touch region 12 are equal.

Certainly, in some embodiments, the first interval D1 between adjacent touch units in the first touch region 11 can be different from the second interval D2 between adjacent touch units in the second touch region 12. For example, the first interval D1 is smaller than the second interval D2, so that the wiring region 112 in the first touch region 11 has a larger area to accommodate more touch lines, and further reduce the bezel width of the touch display panel 100, which is beneficial to a narrow bezel design of the touch display panel 100.

Please refer to FIG. 2, in some embodiments, the touch layer 10 comprises multiple first touch regions 11 and multiple second touch regions 12, and the first touch regions 11 and the second touch regions 12 are alternately arranged.

It should be noted that the first touch area 11 and second touch area 12 being alternately arranged means that any two adjacent touch regions in the touch layer 10 are different touch regions.

Furthermore, the touch lines 114 of the touch layer 10 comprise a first touch line and a second touch line. Each touch unit in the first touch region 11 is connected to one end of one first touch line, and another end of the first touch line is connected to the connecting portion 20.

Each touch unit in the second touch region 12 adjacent to the column of the first touch units 13 is connected to one end of the second touch line, and another end of the second touch line is connected to the connecting portion 20.

The first touch line is bent and connected to the connecting portion 20, and the first touch line comprises a first line segment connected to the connecting portion 20. The second touch line is also bent and connected to the connecting portion 20, and the second touch line comprises a second line segment connected to the connecting portion 20.

At least a portion of the first line segments and at least a portion of the second line segments are located in the wiring region 112 of the first touch region 11. For example, some of the first line segments of all the first touch lines are located in the wiring region 112, and some of the second line segments of all the second line segments of the second touch lines are located in the wiring region 112. Alternatively, some of the first line segments are located in the wiring region 112, and some of the second line segments are located in the wiring region 112. Certainly, at least a portion of the first line segments and at least a portion of the second line segments being located in the wiring region 112 of the first touch region 11 can mean that, some of the first line segments are partially located in the wiring region 112, and some of the second line segments are partially located in the wiring region 112.

In some embodiments, the first line segments and the second line segments are arranged symmetrically with respect to an axial direction.

Furthermore, the first line segment comprise a first sub-segment in a second direction and a second sub-segment in a third direction; the second line segment comprise a third sub-segment in the third direction and a fourth sub-segment in the third direction; the second direction is perpendicular to the third direction, and the third direction is parallel to the first direction, that is to say, the second direction is perpendicular to the first direction.

The first sub-segments are arranged at equal intervals in the wiring region 112, and the third sub-segments are arranged at equal intervals in the wiring region 112.

In some embodiments, the first touch region 11 can include only one first touch unit 13, and other touch units in the first touch region 11 are all second touch units 14. The first touch unit 13 can be located between two second touch units 14, or the first touch unit 13 can also be located at a position farthest from the connecting portion 20 in the first touch region 11. Under this condition, a distance between the first touch unit 13 and the connecting portion 20 is greater than a distance between any second touch unit 14 in the first touch region 11 and the connecting portion 20.

Certainly, the first touch unit 13 can also be located at a position closest to the connecting portion 20 in the first touch region 11, and the distance between the first touch unit 13 and the connecting portion 20 is less than the distance between any one of the second touch units 14 in the first touch region 11 and the connecting portion 20.

Further, since the first interval D1 between adjacent touch units in the first touch region 11 is the same as the second interval D2 between adjacent touch units in the second touch region 12, the touch units of the touch layer 10 are distributed in a matrix.

In some embodiments, the first touch region 11 can comprise multiple first touch units 13. For example, the first touch region 11 can comprise multiple first touch units 13 and the plurality of second touch units 14, or the first touch region 11 can only comprise multiple first touch units 13 and does not comprise any second touch unit 14.

Figure 3:
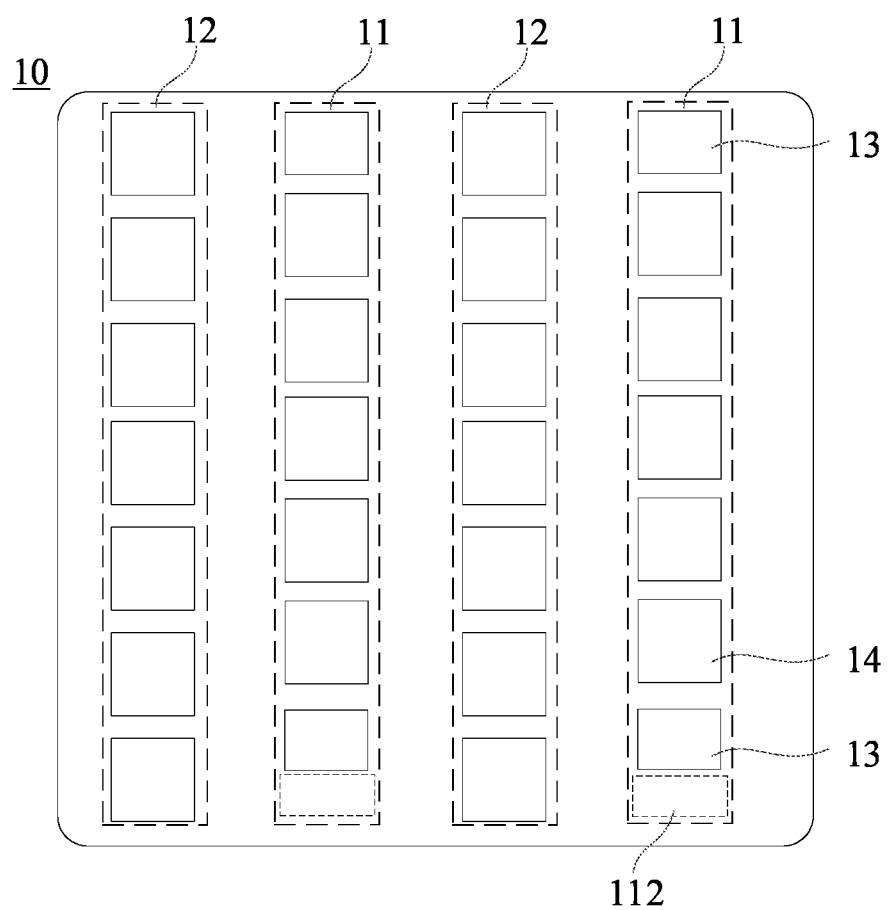
FIG. 3 is a schematic structural view illustrating a touch layer according to one embodiment of the present application.

Please refer to FIG. 3, which is a schematic structural view illustrating the touch layer 10 according to one embodiment of the present application. As shown in FIG. 3, the first touch region 11 can comprise two first touch units 13, wherein the second touch units 14 are all located between the two first touch units 13. In detail, one of the first touch units 13 is the touch unit, closest to the connecting portion 20, among the touch units in the first touch region 11. In other words, the distance between the first touch unit 13 and the connecting portion 20 is less than the distance between any second touch unit 14 in the first touch region 11 and the connecting portion 20. The other first touch unit 13 is the touch unit, farthest from the connecting portion 20, among the touch units in the first touch region 11; in other words, the distance between the first touch unit 13 and the connecting portion 20 is greater than the distance between any second touch unit 14 in the first touch region 11 and the connecting portion 20.

Figure 4:
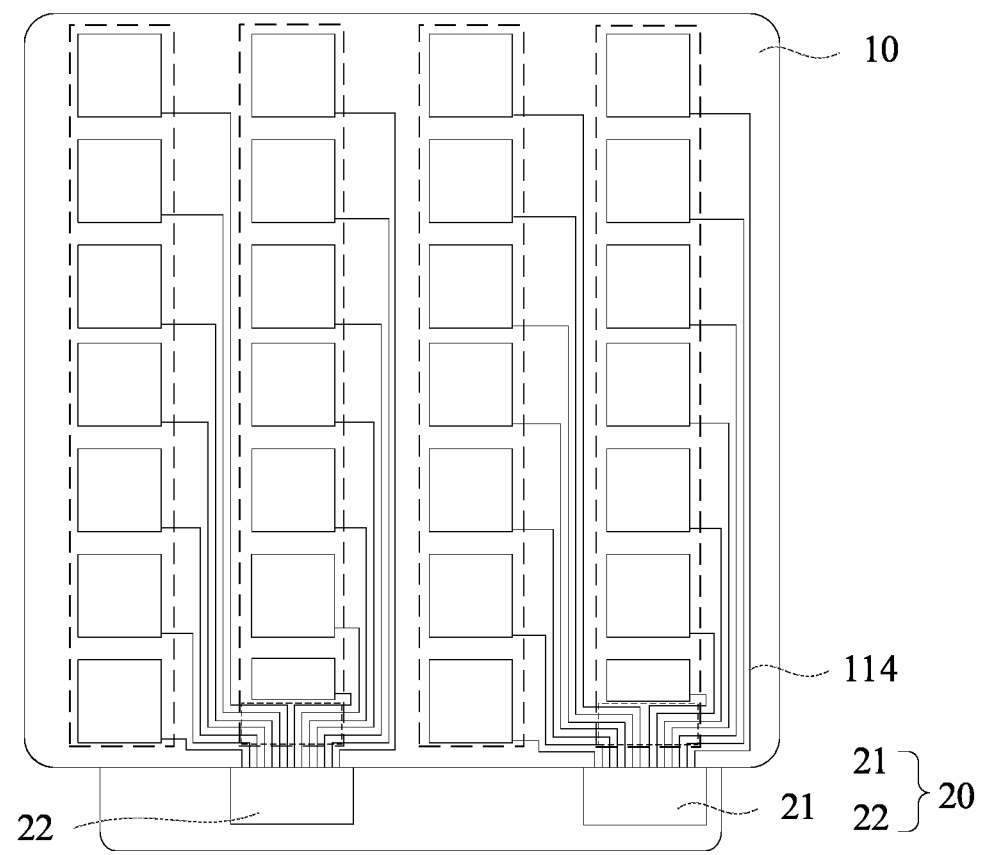
FIG. 4 is a third schematic structural view illustrating the touch display panel according to one embodiment of the present application.

In some embodiments, as shown in FIG. 4, which is a third structural view illustrating the touch display panel 100 according to one embodiment of the present application. The difference between the touch display panel 100 shown in FIG. 4 and the touch display panel 100 shown in FIGS. 1 and 2 is that the connecting portion 20 of the touch display panel 100 shown in FIG. 4 comprises a first connection interface 21 and a second connection interface 22. The first touch line corresponding to the first touch region 11 and the second touch line corresponding to the second touch region 12 adjacent to a column of the first touch region 11 can be connected to the first connection interface 21 or the second connection interface 22.

Figure 5:
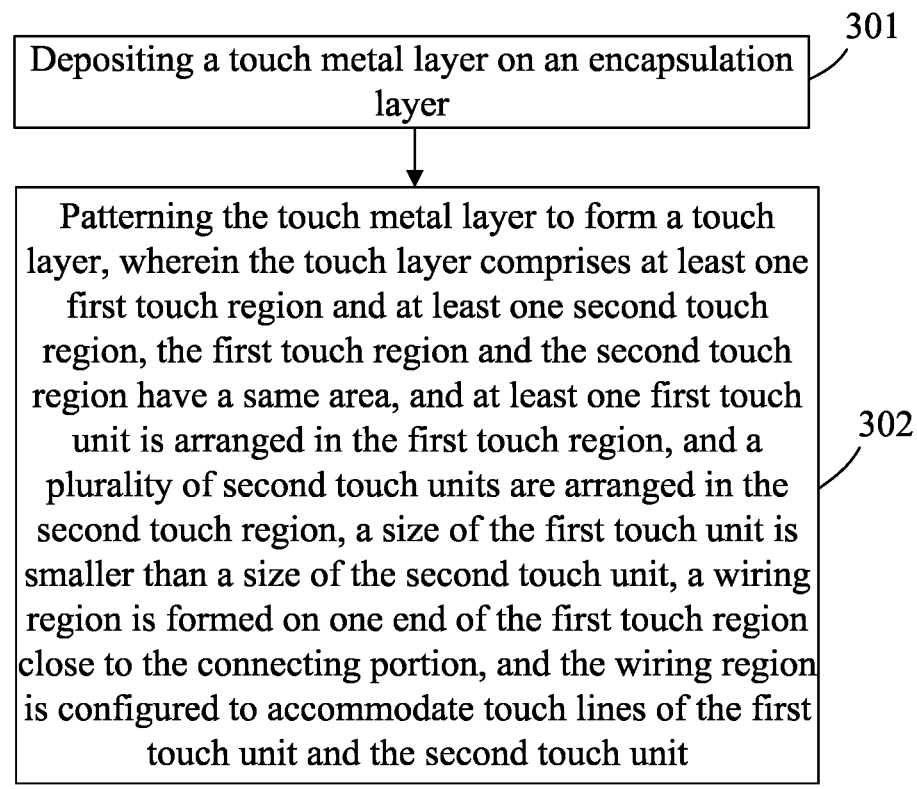
FIG. 5 is a process flow diagram illustrating a manufacturing method of the touch display panel according to one embodiment of the present application.

Please refer to FIG. 5. FIG. 5 is a process flow diagram illustrating a manufacturing method of a touch display panel according to one embodiment of the present application. The manufacturing method of the touch display panel can specifically comprise the following steps:

step S301: depositing a touch metal layer on an encapsulation layer.

The touch display panel can comprise a display panel and the encapsulation layer. The encapsulation layer is used to encapsulate the display panel to protect the display panel and prevent moisture, oxygen, etc. from entering and corroding the display panel. In a manufacturing process of the touch display panel, the touch metal layer can be deposited on the encapsulation layer.

step S302: patterning the touch metal layer to form a touch layer.

The touch layer comprises at least one first touch region and at least one second touch region, the first touch region and the second touch region have a same area, at least one first touch unit is arranged in the first touch region, a plurality of second touch units are arranged in the second touch region, a wiring region is formed on one end of the first touch region close to the connecting portion, and the wiring region is used to accommodate touch lines of the first touch unit and the second touch unit.

The touch metal layer can be subjected to patterning treatment such as photoresist coating, exposure, development, etching, and photoresist removal to form a first touch unit and a second touch unit on the touch metal layer, wherein a size of the first touch unit is smaller than a size of the second touch unit, and the first touch unit and the second touch unit can form the touch layer.

A first distance is defined between the connecting portion and a touch unit closest to the connecting portion in the first touch region, a second distance is defined between the connecting portion and a touch unit closest to the connecting portion in the second touch region, and the first distance is greater than the second distance.

Furthermore, a plurality of touch units in the first touch region are arranged along a first direction, and the plurality of touch units in the first touch region comprise at least one first touch unit; and a plurality of touch units in the second touch region are arranged along the first direction, and all of the plurality of touch units in the second touch region are the second touch units.

In some embodiments, the plurality of touch units in the first touch region comprise one first touch unit and the plurality of second touch units, and the plurality of second touch units in the first touch region are all located at one side of the first touch unit away from the connecting portion.

In some embodiments, a first interval is defined between the adjacent touch units in the first touch region, and a second interval is defined between the adjacent touch units in the second touch region, and the first interval is equal to the second interval.

In some embodiments, the touch layer comprises multiple first touch regions and multiple second touch regions, and the first touch regions and the second touch regions are alternately arranged.

In some embodiments, each touch unit in the first touch region is connected to one end of a first touch line, and another end of the first touch line is connected to the connecting portion; and each touch unit in the second touch region adjacent to a column of the first touch units is connected to one end of a second touch line, and another end of the second touch line is connected to the connecting portion;

wherein the first touch line comprises a first line segment connected to the connecting portion, and the second touch line comprises a second line segment connected to the connecting portion, and at least a portion of the first line segment and at least a portion of the second line segment are located in the wiring region of the first touch region.

In some embodiments, the first line segment comprises a first sub-segment in a second direction and a second sub-segment in a third direction, and the second line segment comprises a third sub-segment in the third direction and a fourth sub-segment in the third direction, the second direction is perpendicular to the third direction, and the third direction is parallel to the first direction.

In some embodiments, the first sub-segments are arranged at equal intervals in the wiring region, and the third sub-segments are arranged at equal intervals in the wiring region.

In some embodiments, after the step of patterning the touch metal layer to form the touch layer, the manufacturing method further comprises: coating a layer of organic material on the touch layer to protect the touch layer.

The above provides a detailed description about the touch display panel and the manufacturing method of the touch display panel of the present application. Specific examples are used to describe the principles and embodiments of the present application. The description of the above embodiments is only used for ease of understanding of the technical solutions and main ideas of the preset application. However, those of ordinary skill in the art should understand that modifications can be made to the technical solutions described in the foregoing embodiments, or equivalent replacement can be made for some of the technical features. Such modifications or replacements should be deemed to be within the protection scope of the present application.

What is claimed is:

1. A touch display panel, comprising:
   a touch layer comprising a plurality of first touch regions and a plurality of second touch regions, wherein multiple touch units are disposed in the first touch regions and the second touch regions, the touch units comprise a plurality of first touch units and multiple second touch units, the first touch regions and the second touch regions each have a same area, and the first touch units are only disposed in the first touch regions; and
   a connecting portion connected to the first touch units and the second touch units through a plurality of touch lines;
   wherein at least one of the first touch units is arranged in each of the first touch regions at one end close to the connecting portion, at least two of the second touch units are disposed in each of the second touch regions, and the touch units in each of the first touch regions and each of the second touch regions are arranged along a first direction; in each of the first touch regions, the touch unit closest to the connecting portion is one of the first touch units; and a size of each of the first touch units is smaller than a size of each of the second touch units, a wiring region is formed on one end of each of the first touch regions close to the connecting portion, and the wiring region is configured to accommodate the touch lines;
   wherein a first interval is defined between each two adjacent touch units in each of the first touch regions, a second interval is defined between each two adjacent touch units in each of the second touch regions, and each of the first intervals is less than each of the second intervals;
   wherein each of the touch lines extends from one of the touch units to the connecting portion, and the touch lines bypass a gap between each second touch region and the connecting portion.

2. The touch display panel according to claim 1, wherein a first distance is defined between the connecting portion and the touch unit closest to the connecting portion in each of the first touch regions, a second distance is defined between the connecting portion and the touch unit closest to the connecting portion in each of the second touch regions, and the first distance is greater than the second distance.

3. The touch display panel according to claim 1, wherein the first touch regions and the second touch regions are alternately arranged.

4. The touch display panel according to claim 3, wherein each touch unit in each of the first touch regions is connected to one end of a first touch line, and another end of the first touch line is connected to the connecting portion; and
   each touch unit in each of the second touch regions adjacent to a column of the first touch units is connected to one end of a second touch line, and another end of the second touch line is connected to the connecting portion;
   wherein each first touch line comprises a first line segment connected to the connecting portion, each second touch line comprises a second line segment connected to the connecting portion, and at least a portion of the first line segment of each first touch line and at least a portion of the second line segment of each second touch line are located in the wiring regions of the first touch regions.

5. The touch display panel according to claim 4, wherein the first line segment of each first touch line comprises a first sub-segment in a second direction and a second sub-segment in a third direction, and the second line segment of each second touch line comprises a third sub-segment in the third direction and a fourth sub-segment in the third direction, the second direction is perpendicular to the third direction, and the third direction is parallel to the first direction.

6. The touch display panel according to claim 5, wherein the first sub-segments are arranged at equal intervals in the wiring regions, and the third sub-segments are arranged at equal intervals in the wiring regions.

7. A manufacturing method of a touch display panel, comprising:
depositing a touch metal layer on an encapsulation layer; and
patterning the touch metal layer to form a touch layer;
wherein the touch layer comprises a plurality of first touch regions and a plurality of second touch regions, multiple touch units are disposed in the first touch regions and the second touch regions, the touch units comprise a plurality of first touch units and multiple second touch units, the first touch regions and the second touch regions each have a same area and the first touch units are only disposed in the first touch regions;
wherein at least one of the first touch units is arranged in each of the first touch regions at one end close to the connecting portion, at least two of the second touch units are disposed in each of the second touch regions, and the touch units in each of the first touch regions and each of the second touch regions are arranged along a first direction; in each of the first touch regions, the touch unit closest to the connecting portion is one of the first touch units; and a size of each of the first touch units is smaller than a size of each of the second touch units, a wiring region is formed on one end of each of the first touch regions close to the connecting portion, and the wiring regions are configured to accommodate touch lines of the first touch units and the second touch units;
wherein a first interval is defined between each two adjacent touch units in each of the first touch regions, a second interval is defined between each two adjacent touch units in each of the second touch regions, and each of the first intervals is less than each of the second intervals;
wherein each of the touch lines extends from one of the touch units to the connecting portion, and the touch lines bypass a gap between each second touch region and the connecting portion.

8. The manufacturing method of the touch display panel according to claim 7, wherein a first distance is defined between the connecting portion and the touch unit closest to the connecting portion in each of the first touch regions, a second distance is defined between the connecting portion and the touch unit closest to the connecting portion in each of the second touch regions, and the first distance is greater than the second distance.

9. The manufacturing method of the touch display panel according to claim 7, wherein the first touch regions and the second touch regions are alternately arranged.

10. The manufacturing method of the touch display panel according to claim 9, wherein each touch unit in each of the first touch regions is connected to one end of a first touch line, and another end of the first touch line is connected to the connecting portion; and
each touch unit in each of the second touch regions adjacent to a column of the first touch units is connected to one end of a second touch line, and another end of the second touch line is connected to the connecting portion;
wherein each first touch line comprises a first line segment connected to the connecting portion, each second touch line comprises a second line segment connected to the connecting portion, and at least a portion of the first line segment of each first touch line and at least a portion of the second line segment of each second touch line are located in the wiring regions of the first touch regions.

11. The manufacturing method of the touch display panel according to claim 10, wherein the first line segment of each first touch line comprises a first sub-segment in a second direction and a second sub-segment in a third direction, and the second line segment of each second touch line comprises a third sub-segment in the third direction and a fourth sub-segment in the third direction, the second direction is perpendicular to the third direction, and the third direction is parallel to the first direction.

12. The manufacturing method of the touch display panel according to claim 11, wherein the first sub-segments are arranged at equal intervals in the wiring regions, and the third sub-segments are arranged at equal intervals in the wiring regions.

\* \* \* \* \*